E. EMMERT.

Combined Seed Sower and Cultivator.

No. 9,518. Reissued Dec. 28, 1880.

WITNESSES

Philip Allwasi.

John A. Ellis.

INVENTOR

Ezra Emmert, by Anderson & Smith his ATTORNEYS

N. PETERS, PHOTO-LITHOGRAPHER, WASHINGTON, D. C.

UNITED STATES PATENT OFFICE.

EZRA EMMERT, OF DIXON, ILLINOIS.

COMBINED SEED-SOWER AND CULTIVATOR.

SPECIFICATION forming part of Reissued Letters Patent No. 9,518, dated December 28, 1880.

Original No. 156,416, dated November 3, 1874. Application for reissue filed October 23, 1880.

*To all whom it may concern:*

Be it known that I, EZRA EMMERT, of Dixon, in the county of Lee and State of Illinois, have invented certain new and useful Improvements in Combined Seed-Sower and Cultivator; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
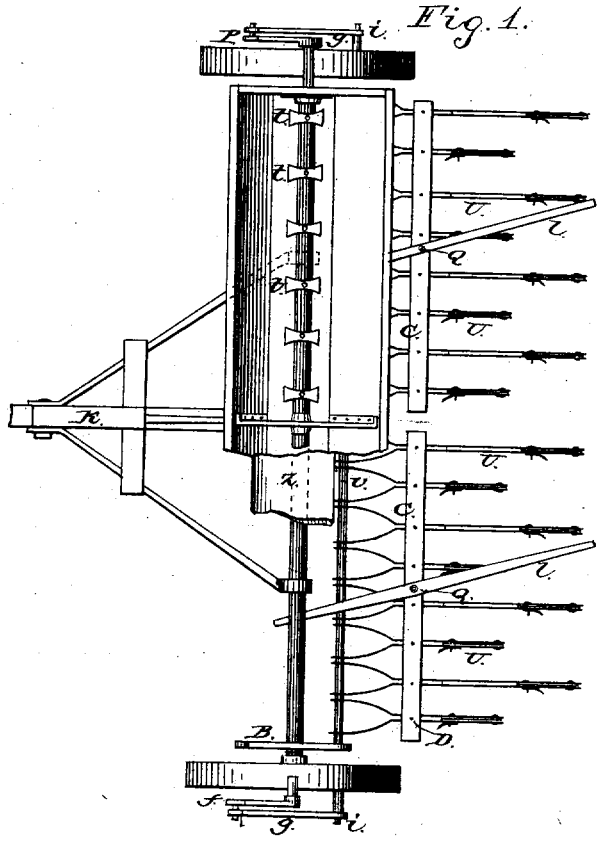
Figure 3:
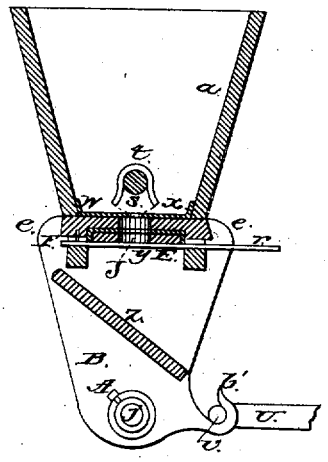
Figure 2:
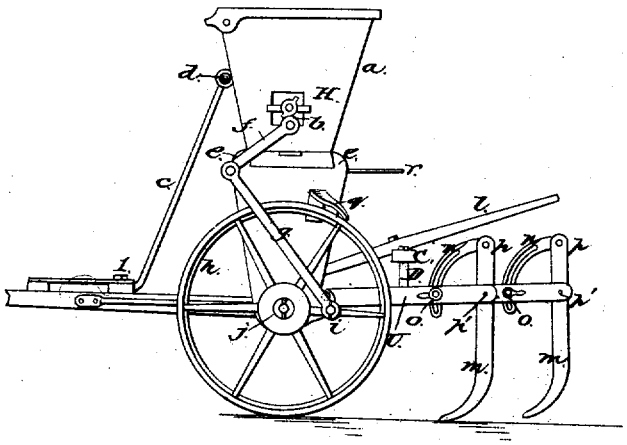

Figure 1 is a top view of the machine, partly broken away. Fig. 2 is an end view, and Fig. 3 is a transverse vertical section, of the seed-box.

This invention has relation to seed-sowers and cultivators; and it consists in the improved features of construction and combination hereinafter fully described, and particularly pointed out in the claims.

In the annexed drawings, *a* represents the seed-box, mounted on wheels *h*, said wheels revolving on hollow axle *j*, to which the draft-pole K is attached. The bottom W of the box is flanged, so that the flanges fit into the sides of said box, and said bottom is perforated with holes or seed-cells J, beneath which is fitted a sliding gage-plate, *x*, by adjusting which the seed-cells may be contracted as desired, thus regulating the discharge.

In the upper part of the seed-box *a* are placed the shafts *s*, longitudinally, each shaft extending half the length of the box and having its inner bearing in a partition fitted securely within said box. The agitator-shafts *s* are placed in line with each other, and to their sides forked pendants or agitators *t* are attached, said agitators working directly over the seed-cells in the bottom of the seed-box. The outer end of each shaft *s* is provided with a crank, *f*, and both these cranks are connected, by pitmen *g*, with the crank-pins *i* on the wheels *h*. At each end of seed-box *a* is cut a square hole, in which is fitted a plate, *b*, on the under sides of which are confined the ends of the agitator-shafts. These plates are locked in said holes by a button, H, extending across the outside of the same. (See Fig. 2.) By this construction the shafts may be readily removed from the box.

*y* is a cut-off, moved by a handle, *r*, pivoted thereto at E, and to the bottom of the seed-box at F.

B are the support-plates, fitted to axle *j*, and secured in position by set-screws A. At the top of the support-plates and on each side, front and rear, are jaws *e*. The front jaw is straight on its inner edge, and the rear jaw beveled, so as to embrace the bottom of the seed-box.

A brace, *c*, attached firmly to the draft-pole by bolt 1, engages in an eye, *d*, in the front of the seed-box. This arrangement holds the seed-box firmly in position and permits its easy removal.

An inclined guide-board, *z*, is placed longitudinally under the seed-box, with its upper end in front of the seed-cells, whereby an even and undisturbed distribution of the seed is effected.

The cultivator-bars U are attached together in sections of eight (more or less) by cross-bars C. Each section is hung upon its own axle, and the sections move independently of each other.

At *b'* are shown the hooks on the support-plates, into which drops one end of the cultivator-rods *v*. Each section has its own rod *v*, one end resting in the hooks, as aforesaid, and the other in a bearing affixed to the draft-pole and hollow axle, so that the teeth may be readily attached and detached.

*m* is the cultivator-tooth, pivoted between the double cultivator-bars U at *p'*, and having a slotted brace, *n*, secured to its upper end by a bolt, *p*. This brace is secured to the bar U by a bolt, *o*, so that the tooth may be set at various angles to its bar.

D is a connecting-rod, pivoted between the bars U, and passing through a slot in cross-bar C, in which it is adjusted by a nut on top, so as to allow the rising and falling of the several teeth *m*.

*l* is a lever used to raise the sections of the cultivator from the ground, pivoted at Q to cross-bar C, and turned under axle *j* when used.

What I claim is—

1. In a seeder and planter, the combination, with the seed-box, of the support-plates B, having jaws *e e* and hooks *b'*, brace *c*, eye *d*, and axle *j*, substantially as set forth.

2. In a seeder and planter, the seed-box *a*, having a centrally-located transverse partition, and square holes at each end of said seed-box, provided with plates *b*, locked therein by buttons H, in combination with the removable agitator-shafts *s s*, having pendants *t*, the arms *f*, and pitmen *g*, connected to the wheels *h*, substantially as and for the purposes set forth.

3. In a combined seed-sower and cultivator, the combination, with the seed-box *a*, having transverse central partition and rectangular openings in its ends, of the removable agitator-shafts *s s*, plates *b b*, and buttons H H, said shafts *s s* being connected to the wheels *h h* by suitable intermediate gearing, substantially as and for the purposes set forth.

4. In a combined seed-sower and cultivator, the combination, with the axle *j*, having a central bearing and end bearings or plates, B B, of independent detachable cultivator-sections, the bars of which are secured to rods *v* and connected by bars C, substantially as set forth.

5. In a seeder and cultivator, the combination, with the seeder, of the independent detachable cultivator-sections, as herein shown and described.

In testimony that I claim the foregoing I have hereunto set my hand this 12th day of October, 1880.

EZRA EMMERT.

Witnesses:
WILLIAM STEVENS,
JOHN BEEBE.